(12) United States Patent
Samii et al.

(10) Patent No.: US 8,989,505 B2
(45) Date of Patent: Mar. 24, 2015

(54) DISTANCE METRIC FOR IMAGE COMPARISON

(71) Applicant: Adobe Systems Incorporated, San Jose, CA (US)

(72) Inventors: Kevin Armin Samii, Berkeley, CA (US); Zhe Lin, Fremont, CA (US); Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 281 days.

(21) Appl. No.: 13/713,729

(22) Filed: Dec. 13, 2012

(65) Prior Publication Data

US 2014/0169684 A1 Jun. 19, 2014

(51) Int. Cl.
*G06K 9/68* (2006.01)
*G06K 9/62* (2006.01)

(52) U.S. Cl.
CPC .................................. *G06K 9/6202* (2013.01)
USPC .......................................... 382/218; 382/181

(58) Field of Classification Search
None
See application file for complete search history.

*Primary Examiner* — Stephen R Koziol
*Assistant Examiner* — Amandeep Saini
(74) *Attorney, Agent, or Firm* — Kilpatrick Townsend & Stockton LLP

(57) ABSTRACT

Systems and methods are provided for generating a distance metric. An image manipulation application receives first and second input images. The image manipulation application generates first and second sets of points corresponding to respective edges of a first object in the first input image and a second object in the second input image. The image manipulation application determines costs of arcs connecting each point from the first set to each point of the second set based on point descriptors for each point of each arc. The image manipulation application determines a minimum set of costs between the first set and the second set that includes a cost of each arc connecting each point of the second set to a point in the first set. The image manipulation application obtains, based at least in part on the minimum set of costs, a distance metric for first and second input images.

22 Claims, 12 Drawing Sheets

US 8,989,505 B2

DISTANCE METRIC FOR IMAGE COMPARISON

TECHNICAL FIELD

This disclosure relates generally to computer-implemented methods and systems and more particularly relates to generating a distance metric for comparing images and other illustrations.

BACKGROUND

Image manipulation programs are used to modify or otherwise use image content captured using a camera. For example, an image manipulation program can modify a first image based on a second image, such as by modifying an aspect ratio or size of the first image. Systems and methods for quantifying difference between objects in different images are therefore desirable.

SUMMARY

One embodiment involves receiving a first input image and a second input image. The embodiment further involves generating a first set of points corresponding to an edge of a first object in the first input image and a second set of points corresponding to an edge of a second object in the second input image. The embodiment further involves determining costs of arcs connecting the first set of points to the second set of points. The costs of arcs can be determined by determining costs for arcs connecting each point from the first set of points to at least some of the second set of points. A cost of each arc is determined based on a point descriptor for each point of the arc. The embodiment further involves determining a minimum set of costs between the first set of points and the second set of points. The embodiment further involves obtaining a distance metric for first input image and the second input image. The distance metric is based at least in part on the minimum set of costs.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Computer-implemented systems and methods are disclosed for generating a distance metric for comparing images, illustrations, or other graphical content. A distance metric is a metric by comparing changes in the outlines (or "edges") of objects between two images. A distance metric can be determined using the composition of images or illustrations. The composition of an image includes spatial relationships between objects in a scene. An image manipulation application can determine a distance metric by determining a correspondence between objects in a first image and objects in a second image.

Figure 1:
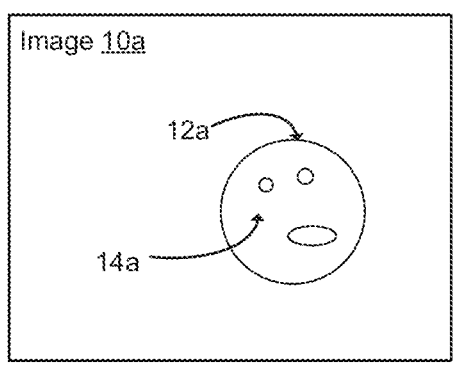
FIG. 1 is a modeling diagram depicting a pair of images for which correspondence between objects can be described via a distance metric.
Figure 1:
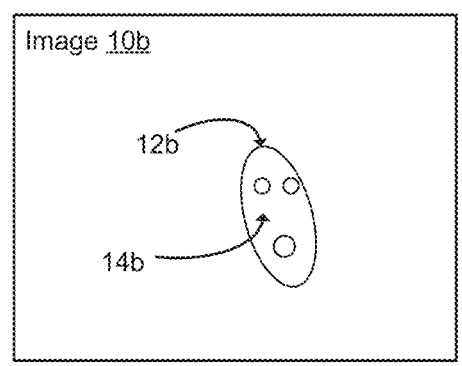

The following non-limiting example is provided to help introduce the general subject matter of certain embodiments. An image manipulation application can determine a correspondence between objects in two images. The image manipulation application can determine a "cost" of the correspondence. A cost can be a quantitative measurement or estimate of a difference between one or more attributes of the objects in each image. The cost of the correspondence can be the distance metric. For example, as depicted in FIG. 1, an edge 12a (i.e., the outline) of object 14a in an image 10a is different from an edge 12b (i.e., the outline) of an object 14b in an image 10b. A correspondence between edges 12a, 12b represents a modification of the edge 12a to obtain the edge 12b. A cost of the correspondence between edges 12a, 12b is an amount of the modification to edge 12a to obtain edge 12b. The image manipulation application can determine the cost by, for example, sampling the edges 12a, 12b to obtain two sets of points, populating a bipartite graph using the two sets of points, and executing a bipartite graph-matching algorithm to obtain an average cost between the two sets of points. The image manipulation application can obtain a distance metric from the computed cost. The distance metric obtained from the cost of the correspondence between objects 14a, 14b provides a quantitative measurement of the difference between images 10a, 10b.

In accordance with one embodiment, an image manipulation application receives first and second input images. The image manipulation application generates first and second sets of points corresponding to respective edges of a first object in the first input image and a second object in the second input image. For example, the image manipulation application can execute a suitable segmentation algorithm to identify the edges of objects in the input images. The image manipulation application can uniformly sample each of the edges to obtain sample points. The first set includes the sample points sampled from the first edge and the second set includes the sample points sampled from the second edge. The image manipulation application determines costs of arcs connecting each point from the first set to at least some of points of the second set based on point descriptors for each point of each arc. For example, the image manipulation application can determine a cost for arcs between each point in the first set and a respective group of nearby points in the second set. A point descriptor can include a vector characterizing a given point. The point descriptor can include an edge confidence, a scale-invariant feature transform descriptor, a shape context describing an arrangement of points around the given point, and a relative position of the point in a plane. An edge confidence can be a measure of the accuracy of an edge as determined by a segmentation algorithm. A cost can be a determined from a scalar difference between vectors representing point descriptors. The image manipulation application determines a minimum set of costs between the first set and the second set that includes a cost of each arc connecting each point of the second set to a point in the first set. The image manipulation application obtains a distance metric for first and second input images that is based at least in part on the minimum set of costs. For example, a distance metric may be obtained from the average cost of the minimum set of costs.

In some embodiments, the distance metric can be determined using a bipartite graph. The image manipulation application can organize the first set of points and the second set of points in a bipartite graph. The first set of points form a first set of nodes in the bipartite graph and the second set of points form a second set of nodes in the bipartite graph. For each of the first set of nodes, the image manipulation application generates an arc connecting the node to each nearby node in the second set of nodes. A cost is identified for each arc. The image manipulation application determines the minimum set of costs by generating a minimum-cost bipartite graph. The average arc cost in the minimum-cost bipartite graph is the distance metric.

In additional or alternative embodiments, the image manipulation application can supplement the first and second sets of points with outlier points. Outlier points are used to equalize the number of points in each set if the two images are sufficiently different. For example, the edges of corresponding objects between the two input images may differ in length. Sampling the edges in each image may generate different number of points in each set. Including the outlier points increases the average cost of connecting the first set of points to the second set of points in a bipartite graph. The image manipulation application can determine that the first set of points and the second set of points include different numbers of points. The image manipulation application can add outlier points to at least one of the first set of points or the second set of points. Adding the outlier points equalizes the number of points between first set of points and the second set of points.

A cost of an arc between an outlier point and a non-outlier point has a higher cost than an arc between a non-outlier point and another non-outlier point. A cost of an arc between an outlier point and another outlier point is zero.

In additional or alternative embodiments, the image manipulation application can use a distance metric to automatically crop images. The image manipulation application can receive an example input image and a set of candidate cropped versions of a second image. The image manipulation application can determine a respective distance metric between the example image and each of the cropped versions of a second image. The image manipulation application can select one of the cropped versions of a second image that is nearest to the example image. The nearest cropped version is determined based on which of the cropped has a minimum value for the distance metric. In some embodiments, the example image can be selected based on input to the image manipulation application received via a computing device. The image manipulation application can thus perform batch processing on the example images and candidate cropped versions of a second image. In other embodiments, the example image can be selected from a database of well-composed images. The image manipulation application can thus perform automatic aesthetic improvement.

In additional or alternative embodiments, the image manipulation application can use a distance metric to trigger a camera or other suitable image device to capture an image. For example, the image manipulation application can access an input image that includes an outline of objects in a scene, such as coarsely drawn outline of a bird landing on a branch. The camera can image a space, such as a branch of tree where a bird may land, by capturing transient image data. The image manipulation application can determine a distance metric between an object moving into the imaged space and the input image including the outline. The image manipulation application can determine that the distance metric is less than or equal to a threshold distance metric for triggering the camera. The image manipulation application can thus determine that transient image data depicting a bird landing on the branch is sufficiently similar to the outline of the bird. In response to detecting that the distance metric is less than or equal to the threshold distance metric, the image manipulation application can configure the camera to store the image data including an image of the object to a memory device.

Figure 2:
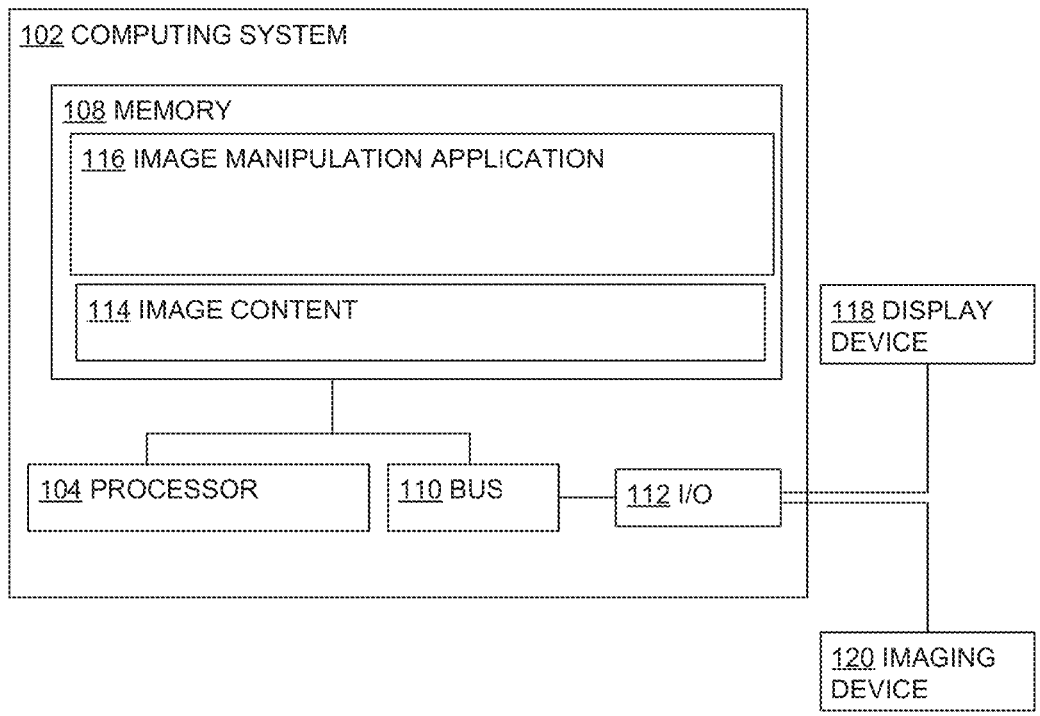
FIG. 2 is a block diagram depicting an example computing system for implementing certain embodiments.

Referring now to the drawings, FIG. 2 is a block diagram depicting an example computing system 102 for implementing certain embodiments.

The computing system 102 includes a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interface 112, a display device 118, and an imaging device 120. A bus 110 can also be included in the computing system 102. The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

A non-limiting example of an imaging device 120 is a camera having an energy source, such as a light emitting diode ("LED"), and an optical sensor. An imaging device 120 can include other optical components, such as an imaging lens, imaging window, an infrared filter, and an LED lens or window. In some embodiments, the imaging device 120 can be a separate device configured to communicate with the computing system 102 via the I/O interface 112. In other embodiments, the imaging device 120 can be integrated with the computing system 102. In some embodiments, the processor 104 can cause the computing system 102 to copy or transfer image content 114 from memory of the imaging device 120 to the memory 108. In other embodiments, the processor 104 can additionally or alternatively cause the computing system 102 to receive image content 114 captured by the imaging device 120 and store the image content 114 to the memory 108.

Figure 3:
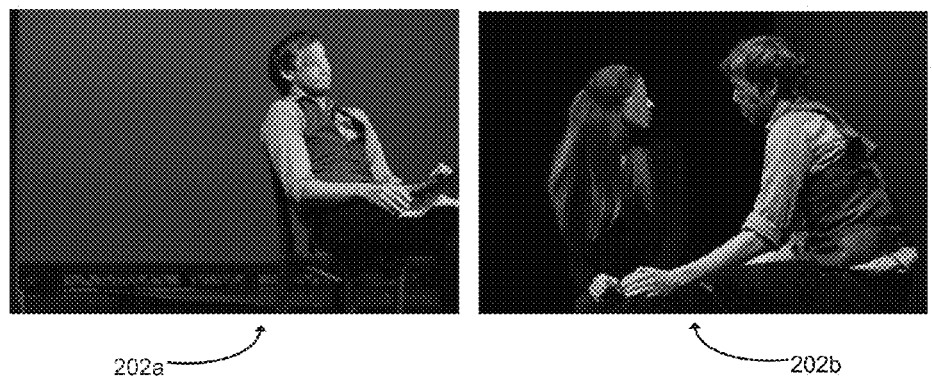
FIG. 3 is a diagram depicting a pair of images for which an image manipulation application can determine a distance metric.

FIG. 3 is a diagram depicting two images for which an image manipulation application can determine a distance metric.

An image manipulation application 116 stored in the memory 108 can configure the processor 104 to modify, access, render, or otherwise use the image content 114 for display at the display device 118. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can include any suitable computing device for executing the image manipulation application 116. Non-limiting examples of a computing device include a desktop computer, a tablet computer, a smart phone, a digital camera, or any other computing device suitable for rendering the image content 114.

FIG. 3 is a diagram depicting a pair of images 202a, 202b for which an image manipulation application 116 can determine a distance metric. A distance metric can describe a difference in the position of the man depicted sitting in a chair and facing to the right in the image 202a and the man depicted sitting in a chair and facing to the left in the image 202b. The image manipulation application 116 can determine a distance metric by, for example, identifying the edges of the man in each image and determining a correspondence between the man objects as depicted in the two images 202a, 202b. The image manipulation application 116 can determine the correspondence by sampling points from the images 202a, 202b to obtain two sets of points, determining a cost between pairs of points in the two sets of points, and determine a minimum-cost solution for a bipartite graph matching problem, as described below with respect to FIGS. 4-7.

Figure 4:
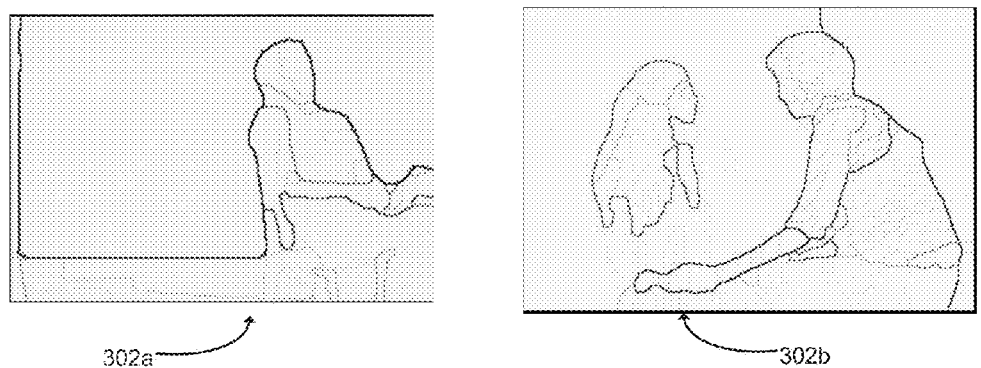
FIG. 4 is a diagram depicting a pair of segmented images generated by the image manipulation application executing a segmentation algorithm to determine a distance metric.

FIG. 4 is a diagram depicting a pair of segmented images 302a, 302b generated by the image manipulation application 116 executing a segmentation algorithm to determine a distance metric. The image manipulation application 116 can execute any suitable segmentation algorithm, such as a region segmentation algorithm, to identify the edges of the objects depicted in images 202a, 202b. The output of the segmentation algorithm includes the segmented images 302a, 302b depicting the edges of objects in images 202a, 202b.

In some embodiments, the image manipulation application 116 executes a hierarchical segmentation algorithm. The hierarchical segmentation algorithm can provide confidence scores for the edges in segmented images 302a, 302b. A confidence score for each edge provides an estimate of the accuracy of each edge. The accuracy of an edge corresponds to whether a segmentation algorithm accurately identifies an object boundary as an edge rather than any internal pixels of an object. For example, edges that are more sharply delineated in the images 202a, 202b can provide higher confidence scores in the execution of segmentation algorithm.

Figure 5:
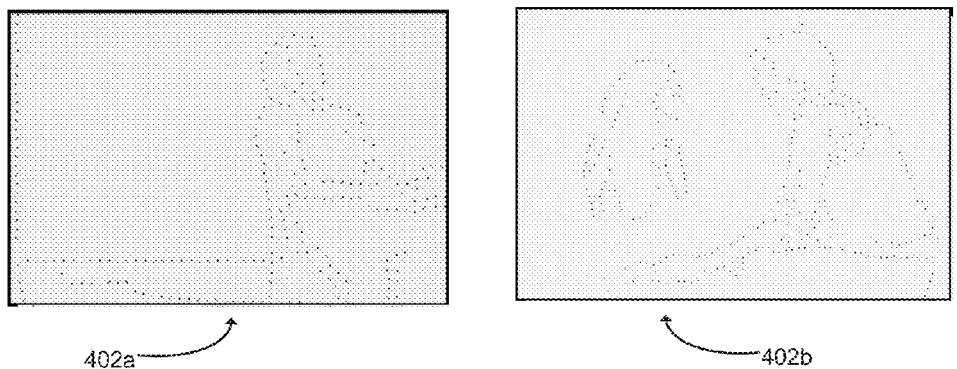
FIG. 5 is a diagram depicting a pair of sparsified images generated by the image manipulation application executing a sampling algorithm to determine a distance metric.

FIG. 5 is a diagram depicting a pair of sparsified images 402a, 402b generated by the image manipulation application 116 executing a sampling algorithm to determine a distance metric. The sparsified images 402a, 402b include sequences of points corresponding to the outlines or edges in the segmented images 302a, 302b. The image manipulation application 116 can generate the sparsified images 402a, 402b by uniformly sampling the outlines of each edge in segmented images 302a, 302b. For example, the image manipulation application 116 can obtain a sample point in each 10 pixels× 10 pixels region of the segmented images 302a, 302b.

The image manipulation application can generate a point descriptor for each sampled point in the sparsified images 402a, 402b. A point descriptor is a logical organization of data, such as (but not limited to) a vector, that includes one or more values for one or more attributes of a point. The point descriptor can characterize each of the points in the sparsified images 402a, 402b.

One attribute included in a point descriptor is an edge confidence. The image manipulation application 116 can obtain the edge confidence from a confidence score as determined by the segmentation algorithm.

Another attribute included in a point descriptor is a scale-invariant feature transform ("SIFT") descriptor for a point. For example, the image manipulation application 116 can generate a 128-dimensional SIFT descriptor of a region around the point, such as a region having a size of 20 pixels× 20 pixels.

Another attribute included in a point descriptor is a shape context for the point. The shape context can include a spatial histogram of nearby points with respect to a given point. A non-limiting example of a nearby point is any point within a 15% relative distance from the given point. In some embodiments, the image manipulation application can modify the shape context by using linear radial binning. Using linear radial binning can allow the shape context to be more robust against small variations. For example, the image manipulation application 116 can perform linear radial binning (rather than log-radial binning) with a radial bin radius of five pixels, with 10 radial bins and 8 linear distance bins.

Another attribute included in a point descriptor is a relative position of the point within an x-y plane corresponding to one of the sparsified images 402a, 402b.

Figure 6:
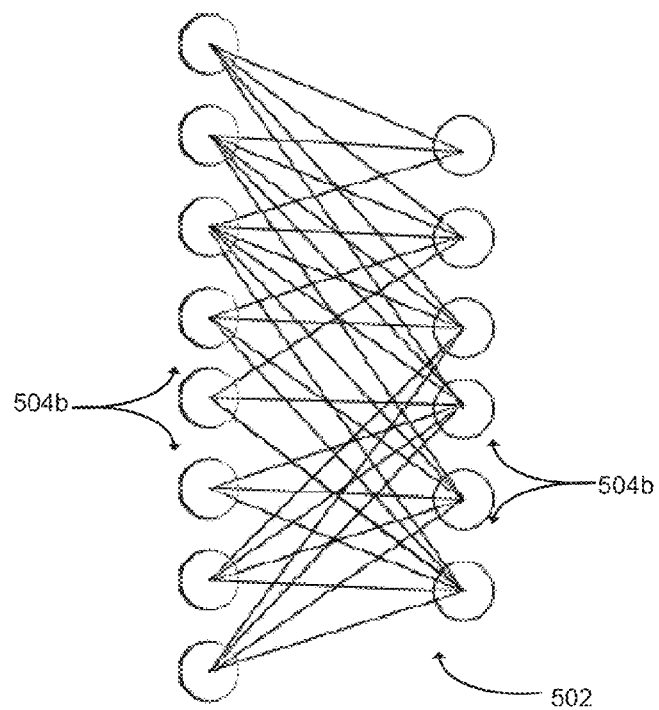
FIG. 6 is a modeling diagram depicting a bipartite graph including nodes representing sampled points from the pair of sparsified images used by the image manipulation application to determine a distance metric.

FIG. 6 is a modeling diagram depicting a bipartite graph including sampled points 504a, 504b from the pair of sparsified images 402a, 402b used by the image manipulation application 116 to determine a distance metric. The image manipulation application 116 can populate a bipartite graph 302 with the points 504a from the sparsified image 402a and the points 504b from the sparsified image 402b.

The image manipulation application 116 can determine a cost for matching each point in the sparsified image 402a to a nearby point in the sparsified image 402a. A non-limiting example of a nearby point is any point within a 15% relative distance from the given point. The costs are depicted in FIG. 6 as the weighted arcs 506 of the bipartite graph 502. The weighted arcs 506 can indicate the similarity between the two points corresponding to the nodes connected by the arcs. The image manipulation application 116 can determine a cost for each arc as a function of the point descriptors for the two points (i.e., the nodes in the bipartite graph 502) connected by a given arc. For example, each of the point descriptors can be represented by a vector. A cost difference for the two points can be a scalar difference between the two vectors. The scalar difference can be a weighted average of the attribute values in the vector, such as an average difference between SIFT descriptor values for each vector, an average difference between the edge confidences for each vector, an average difference between the shape context values for each vector, an average difference between the shape context values for each vector, and a Euclidean distance between the two relative positions. In some embodiments, the image manipulation application 116 can normalize each of the four costs for the four attributes to a [0, 1] numerical space.

In additional or alternative embodiments, the image manipulation application can supplement the sets of nodes in the bipartite graph 502 using outlier nodes. The outlier nodes can account for differences in the lengths of the object edges between the segmented image 302a and the segmented image 302b. A difference in the lengths of the edges between the segmented image 302a and the segmented image 302b can cause the number of sampled points in sparsified image 402a to differ from the number of sampled points in sparsified image 402b. Including the outlier nodes can provide a one-to-one matching between the points 504a, 504b in the bipartite graph 502.

For example, given a bipartite graph 502 with $n_l$ nodes from the set of points 504a and $n_r$ nodes from the set of points 504b, the image manipulation application 116 may add $n_l$ outlier nodes to the right set and $n_r$ nodes to the left set. The image manipulation application 116 may determine a cost of randomly connecting non-outlier nodes (i.e., nodes corresponding to points sampled from the segmented images 302a, 302b) to outlier nodes. For example, the image manipulation application 116 can determine the cost of 20 random connections between non-outlier nodes to outlier nodes. The image manipulation application 116 may also determine a cost of randomly connecting outlier nodes in one set to other outlier nodes in the other set. Arcs between two outlier nodes have no cost. Arcs between a non-outlier node and an outlier node have a cost proportional to the saliency of region from which the point corresponding to the non-outlier node is sampled. The saliency of image content can include characteristics such as (but not limited to) visual uniqueness, unpredictability, rarity, or surprise. The saliency of image content can be caused by variations in image attributes such as (but not limited to) color, gradient, edges, and boundaries.

The saliency of a region can be determined using a saliency map. A saliency map can be extracted or otherwise generated based on, for example, a global contrast by separating a large-scale object from its surroundings. Global considerations can allow assignment of comparable saliency values to similar image regions and can uniformly highlight entire objects. The saliency of an image region can be determined based on a contrast between the image region and nearby image regions. In a non-limiting example, a saliency map can be generated via a histogram-based contrast method. The histogram-based contrast method can include assigning pixel-wise saliency values based on color separation from other image pixels to produce a full resolution saliency map. A smoothing procedure can be applied to control quantization artifacts. Generating a saliency map can also include using spatial relations to produce region-based contrast maps. The region-based contrast map can segment an input image into regions and assign saliency values to the regions. The saliency value of a region can be determined based on a global contrast score that is measured by a contrast of a region and spatial distances to other regions in the image.

Figure 7:
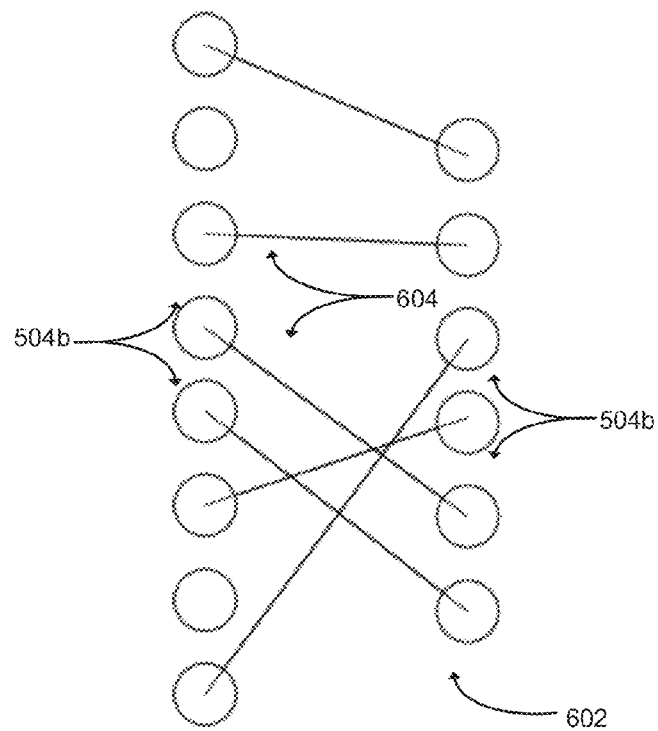
FIG. 7 is a modeling diagram depicting a least-cost bipartite graph solution including the sampled points from the pair of sparsified images used by the image manipulation application to determine a distance metric.

FIG. 7 is a modeling diagram depicting a least-cost bipartite graph solution including nodes representing the sampled points from the pair of sparsified images used by the image manipulation application 116 to determine a distance metric. The graph 602 depicted in FIG. 7 is a minimum-cost bipartite graph generated by the image manipulation application 116. The image manipulation application 116 can execute a suitable algorithm for generating the minimum-cost bipartite graph 602, such as a sparse assignment problem-solving algorithm. The image manipulation application 116 can determine a distance metric between the images 202a, 202b based on the average cost for the arcs 604 of the minimum-cost bipartite graph 602.

The image manipulation application 116 can execute any suitable algorithm for generating the minimum-cost bipartite graph 602. For example, an efficient algorithm for constructing matchings in a minimum-cost bipartite graph 602 can be based on constructing augmenting arcs or other paths in graphs. For example, given at least a partial matching M in a graph G, an augmenting path P can be a path of edges. Each odd-numbered edge (including the first and last edge) is not included in M. Each even-numbered edge is included in M. First and last vertices may be excluded form M. Even-numbered edges of P can be deleted from M. The deleted edges can be replaced with the odd-numbered edges of P to enlarge the size of the matching by one edge. A matching may be a maximum if the matching does not include any augmenting path. Maximum-cardinality matchings can be constructed by searching for augmenting paths and stopping in response to an absence of augmenting paths.

In additional or alternative embodiments, the image manipulation application 116 can sample the segmented images 302a, 302b at different confidence thresholds such as, for example, confidence thresholds of 50%, 35%, and 15%. The image manipulation application 116 can generate a minimum-cost bipartite graph for each set of sparsified images obtained at different confidence thresholds. The image manipulation application 116 can average the distance metrics from obtained from the different minimum-cost bipartite graphs.

Although FIGS. 6 and 7 depict the use of a bipartite graph to obtain the distance metric, other implementations are possible. The image manipulation application 116 can determine the distance metric using any suitable optimization algorithm for optimizing the average cost of connections between samples points from a first image and a second image.

Figure 8:
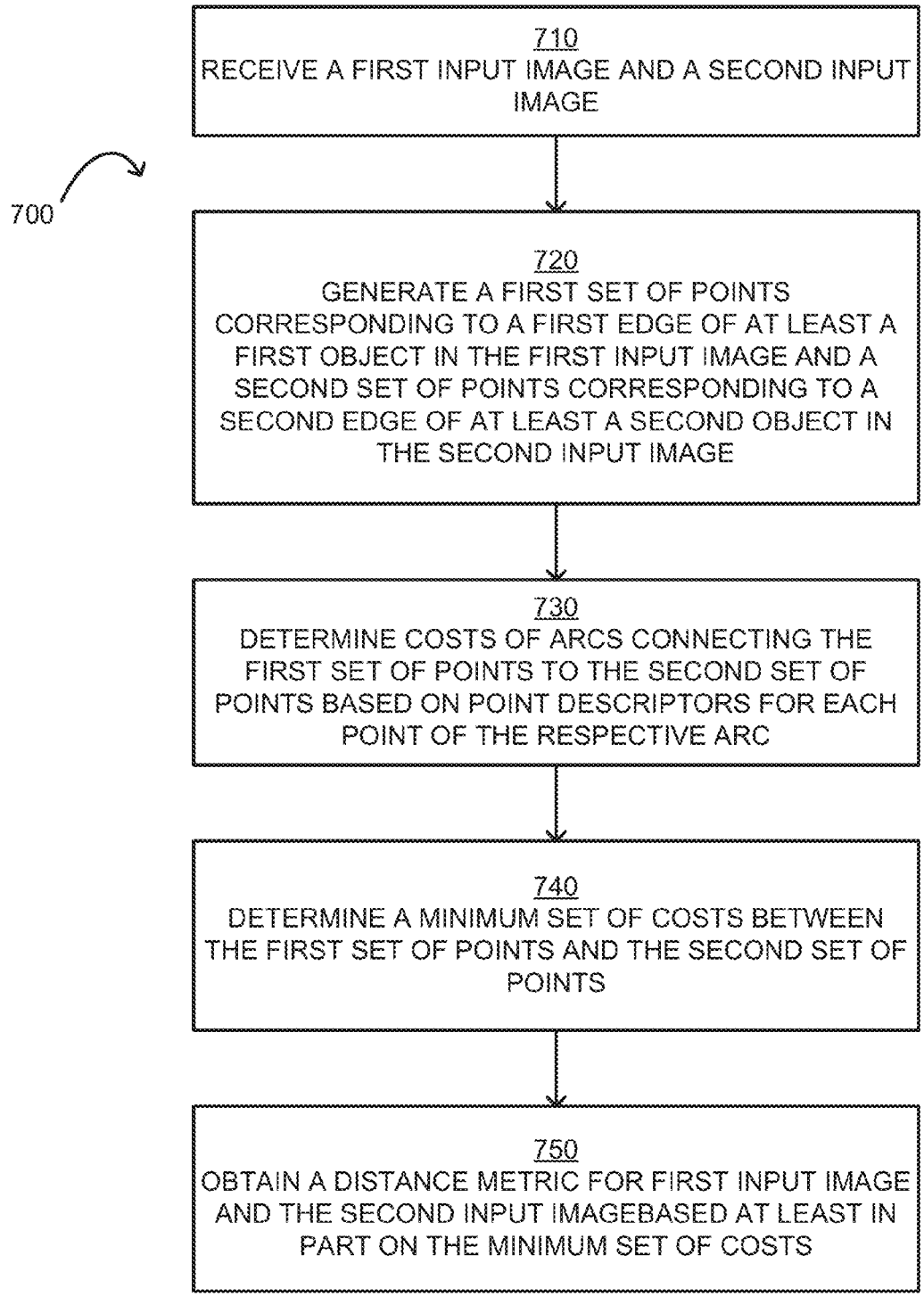
FIG. 8 is a flow chart illustrating an example method for performing generating a distance metric for comparing images and illustrations.

FIG. 8 is a flow chart illustrating an example method 700 for performing generating a distance metric for comparing images and illustrations. For illustrative purposes, the method 700 is described with reference to the system implementation depicted in FIG. 2. Other implementations, however, are possible.

The method 700 involves receiving a first input image and a second input image, as shown in block 710. The processor 104 of the computing system 102 can execute the image manipulation application 116 to receive the input images. For example, the image manipulation application 116 can access input images captured by an imaging device 120.

The method 700 further involves generating a first set of points corresponding to a first edge of at least a first object in the first input image and a second set of points corresponding to a second edge of at least a second object in the second input image, as shown in block 720. The processor 104 of the computing system 102 can execute the image manipulation application 116 to generate the sets of points, as described above with respect to FIGS. 3-5.

The method 700 further involves determining costs of arcs connecting the first set of points to the second set of points, as shown in block 730. The processor 104 of the computing system 102 can execute the image manipulation application 116 to determining the costs of the arcs, as described above with respect to FIGS. 6 and 7. For each of the first set of points the image manipulation application 116 can determine a cost of an arc connecting the point to each nearby point in the second set of points. The cost is determined based on a point descriptor for each point of the arc.

The method 700 further involves determining a minimum set of costs between the first set of points and the second set of points, as shown in block 740. The processor 104 of the computing system 102 can execute the image manipulation application 116 to determine the minimum set of costs, as described above with respect to FIGS. 6-7. For example, the minimum set of costs can be determined from a minimum-cost bipartite graph 602.

The method 700 further involves obtaining a distance metric for first input image and the second input image, as shown in block 750. The distance metric is based at least in part on the minimum set of costs. The processor 104 of the computing system 102 can execute the image manipulation application 116 to obtain the distance metric, as described above with respect to FIGS. 6-7.

Figure 9:
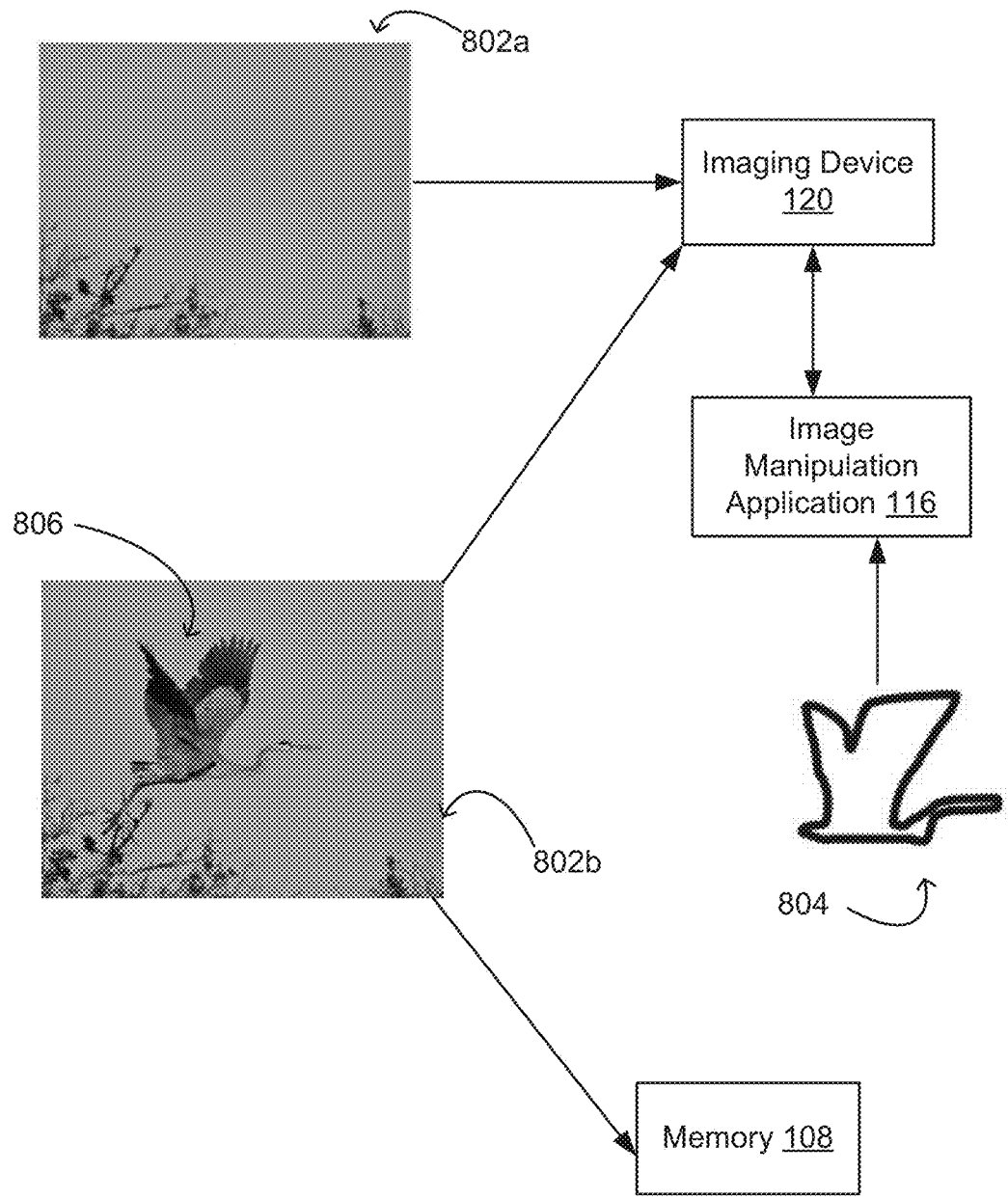
FIG. 9 is a modeling diagram depicting the use of a distance metric to trigger an imaging device.

In additional or alternative embodiments, the image manipulation application can use a distance metric to trigger a camera or other suitable image device to capture an image. For example, FIG. 9 is a modeling diagram depicting the use of a distance metric to trigger an imaging device 120. The imaging device 120 can image a space, such as a branch of tree where a bird may land. The imaging device 120 can provide transient data to the image manipulation application 116. The transient data can include image data 802a, 802b depicting the imaged space at different points in time. The image manipulation application 116 can access an input image 804 that includes an outline of objects in a scene, such as coarsely drawn outline of a bird landing on a branch. The image manipulation application 116 can configure the processor 104 to store temporarily store transient image data depicting the imaged space in a random-access memory device. The image manipulation application 116 can determine a distance metric between the image data and the input image 804. The image manipulation application can determine whether the distance metric is less than or equal to a threshold distance metric for triggering the camera. If the distance metric exceeds the threshold distance metric, the image manipulation application 116 can configure the processor 104 to discard the transient image data. If the distance metric is less than or equal to the threshold distance metric, the image manipulation application 116 can configure the processor 104 to store the transient image data to memory 108. For example, as depicting in FIG. 8, in response to detecting that that the distance metric for the input image 804 and the image data 802b including the bird object 806 is less than or equal to the threshold distance metric, the image manipulation application 116 can cause the image data 802b to be stored to the memory 108.

Figure 10:
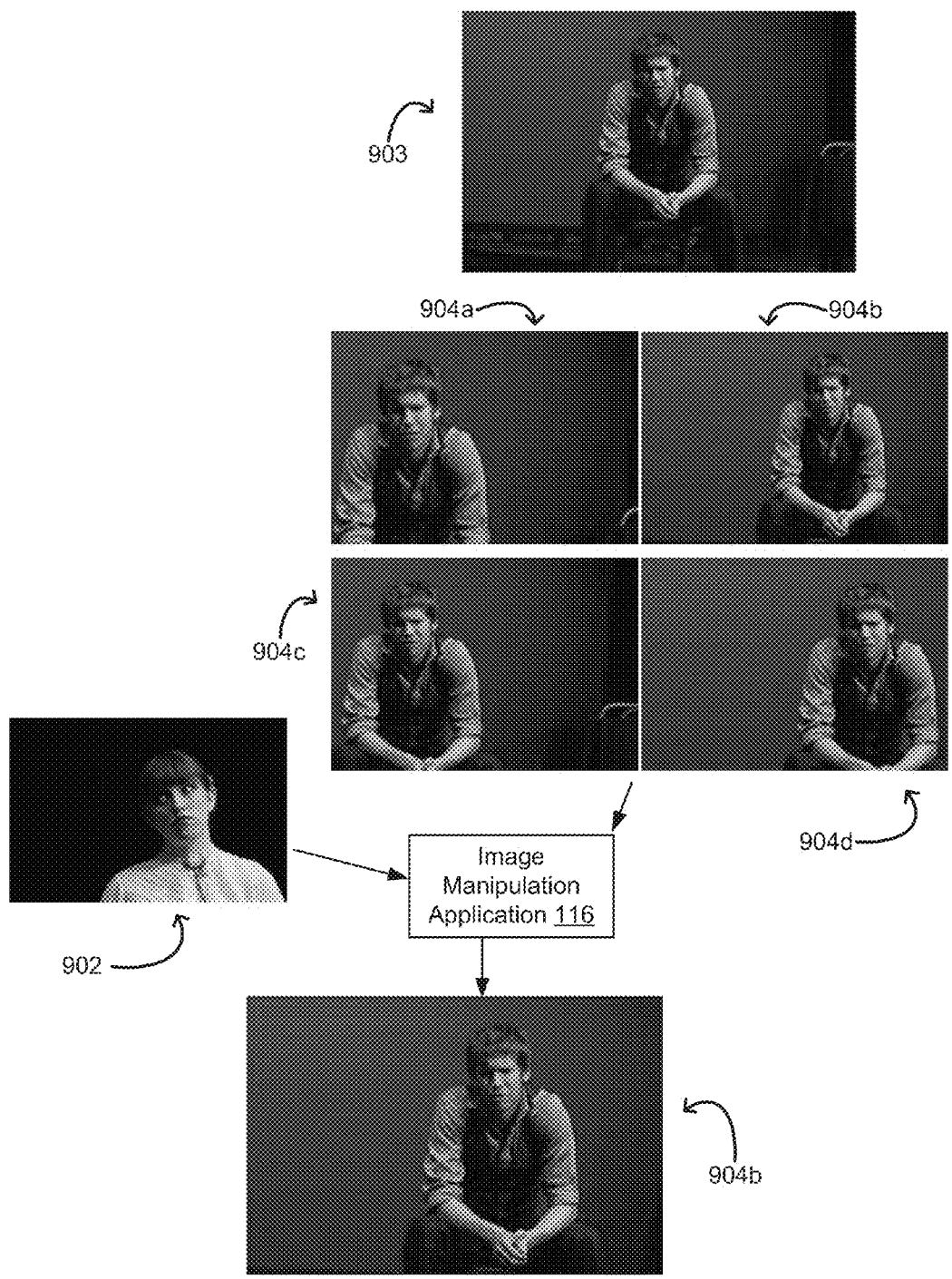
FIG. 10 is a modeling diagram depicting an example flow of communications for selecting a cropped image matching an example image using a distance metric.

In additional or alternative embodiments, the image manipulation application 116 can select a cropped version of an image that most closely matches a well-cropped example image, as determined by comparing the distance metric for each of several cropped versions to the well-cropped example image. For example, FIG. 10 is a modeling diagram depicting an example flow of communications for selecting a cropped image matching an example image using a distance metric. The image manipulation application 116 can receive an example input image 902 and a set of candidate cropped images 904a-d. The image manipulation application 116 can determine a respective distance metric between the example image 902 and each of the cropped images 904a-d. The image manipulation application 116 can access an example image 902 and four cropped images 904a-d that are cropped versions of a second image 903. The example image 902 can be a well-composed image. The image manipulation application 116 can select one of the cropped images 904a-d that is nearest to the example image. The nearest cropped version is determined based on which of the cropped images 904a-d has a minimum value for the distance metric. For example, as depicted in FIG. 10, the image manipulation application 116 selects cropped image 904b as the closest cropped image.

The image manipulation application 116 can determine a respective distance metric for the example image 902 and each of four cropped images 904a-d of a second image. The image manipulation application 116 can determine that the distance metric between the example image 902 and the cropped image 904b is less than the respective distance metrics between the example image 902 and each of the cropped images 904a, 904c, and 904d. The distance metric between the example image 902 and the cropped image 904b may be less than the other distance metrics based on the object depicted in image 902 (i.e., the woman) and the object depicted in image 904b (i.e., the sitting man) being positioned slightly to the right of center in each image. The images 904a, 904c, and 904d may each have larger distance metrics than image 904b with respect to the example image 902 based on the objects depicted in images 904a, 904c, and 904d being positioned at an edge of each image.

Figure 11:
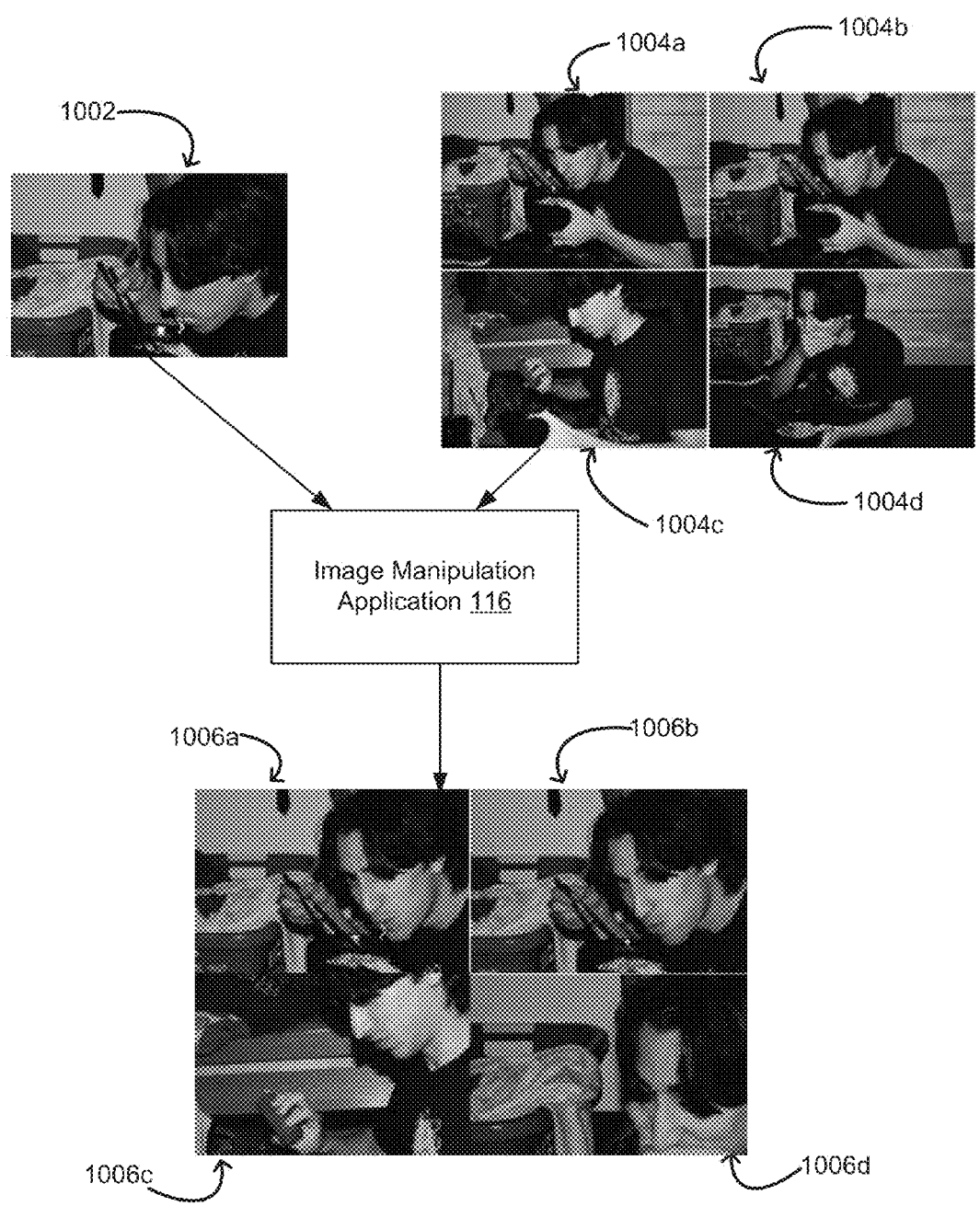
FIG. 11 is a modeling diagram depicting an example flow of communications for automatically cropping images using a distance metric.

In additional or alternative embodiments, the image manipulation application 116 can use a distance metric to automatically crop multiple images. For example, FIG. 11 is a modeling diagram depicting an example flow of communications for automatically cropping images using a distance metric. The image manipulation application 116 can receive an example image 1002 and a set of input images 1004a-d. The image manipulation application 116 can determine a respective distance metric between the example image 1002 and each of the input images 1004a-d. The image manipulation application 116 can select one of the input images 1004a-d that is nearest to the example image. The nearest input image is determined based on which of the input image images 1004a-d has a minimum value for the distance metric. The image manipulation application 116 can determine a cropping of the nearest image that minimizes the distance metric, as described above with respect to FIG. 10. The image manipulation application 116 can apply the same cropping to each of the candidate cropped images 1004*a*-*d* to generate the cropped images 1006*a*-*d*.

In additional or alternative embodiments, the image manipulation application 116 can automatically improve a composition of an input image by using a database of well-cropped example images and a distance metric. Doing so can automatically crop the input image in an aesthetic manner, thereby improving the composition of an image without receiving any input from a user or other input device.

Figure 12:
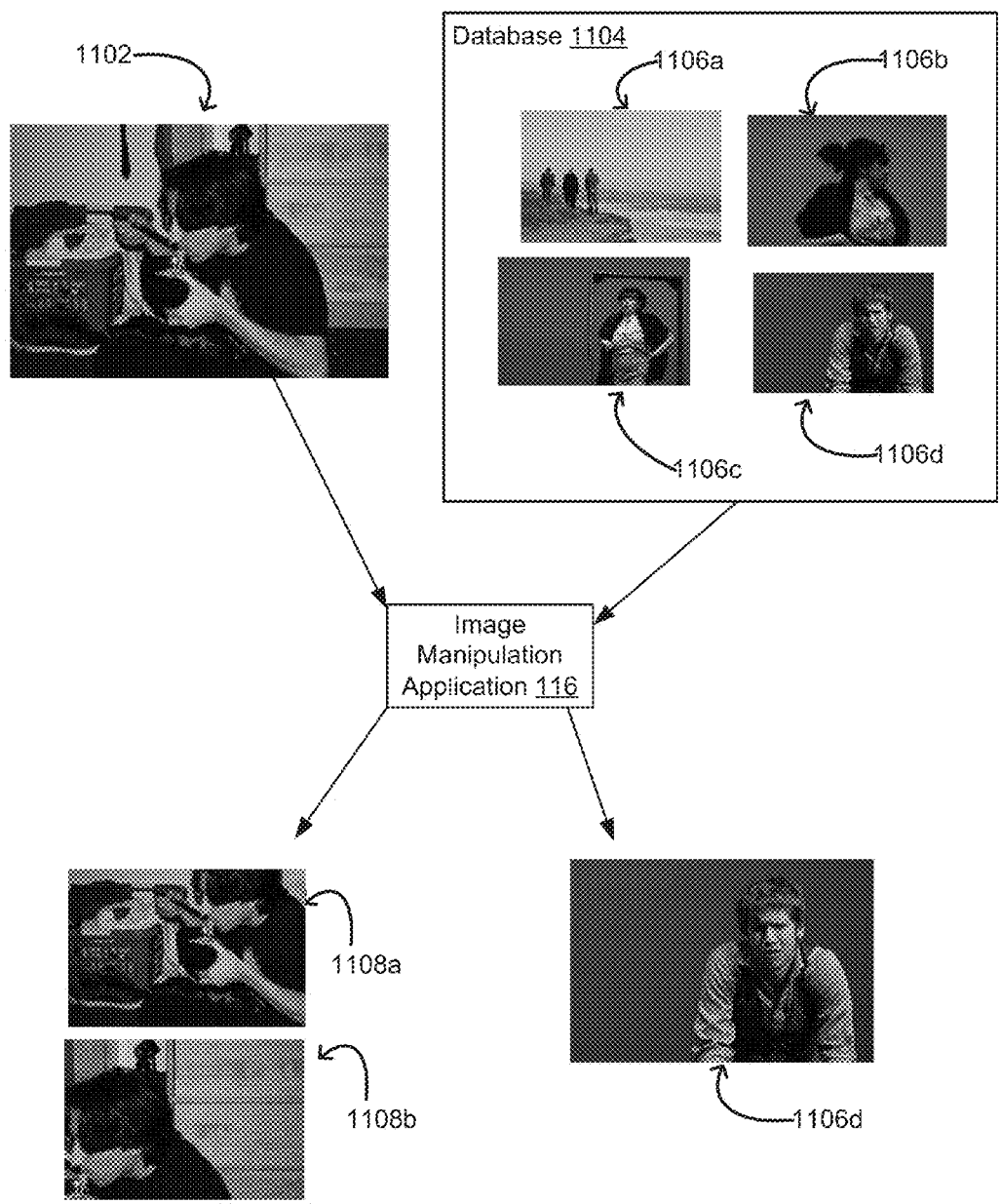
FIG. 12 is a modeling diagram depicting a flow of communication for automatically cropping an input image based on a distance metric.
Figure 13:
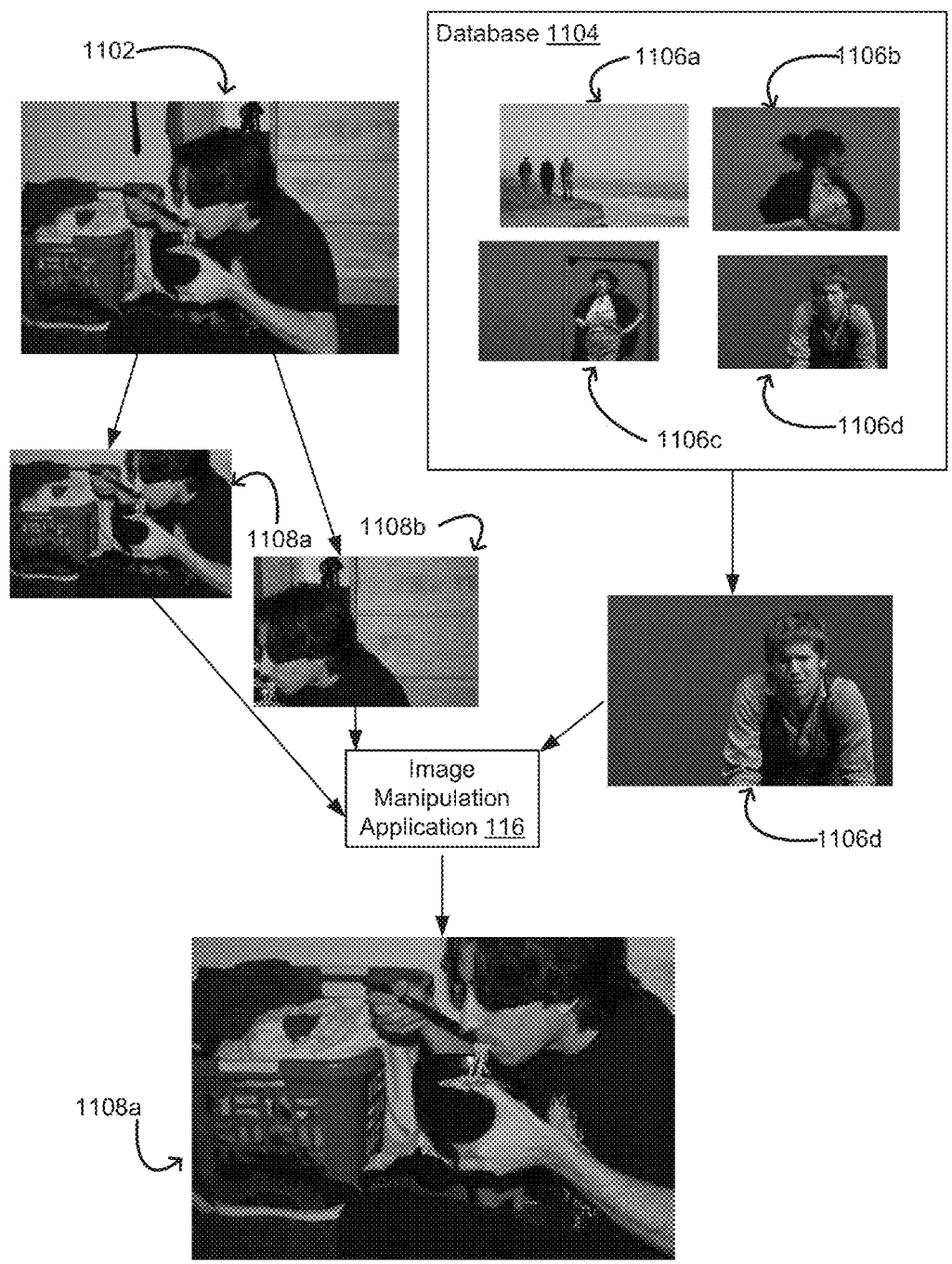
FIG. 13 is a modeling diagram depicting a flow of communication for automatically cropping an input image based on a distance metric.

FIGS. 12-13 are modeling diagrams depicting a flow of communication for automatically cropping an input image 1102 based on a distance metric.

The image manipulation application 116 can compare the input image 1102 of a person standing in front of a house to example images 1106*a*-*d* stored in a database 1104. In some embodiments, the database 1104 may be stored in the memory 108. In other embodiments, the image manipulation application 116 can access the database 1104 stored at a remote location via a data network. The image manipulation application 116 can execute a visual similarity search algorithm to rank the example images 1106*a*-*d* based on the respective visual similarity between each image and the input image 1102. A non-limiting example of a visual similarity search algorithm is a GIST-based image search algorithm. The image manipulation application 116 can select a predetermined number of the example images having the greatest visual similarity to the test image.

FIG. 12 depicts the image manipulation application 116 selecting an example image 1106*d* as being more similar to the input image 1102 than the example images 1106*a*-*c*. The image manipulation application 116 can generate, select, or otherwise access a corresponding number of candidate cropped images for the input image 1102, such as the candidate cropped images 1108*a*, 1108*b*. The image manipulation application 116 can determine a distance metric between each of the candidate cropped images 1108*a*, 1108*b* and the example image 1106*d* selected as being the most similar to the input image. The image manipulation application 116 can select one or more of the candidate cropped versions having the smallest distance metric. For example, FIG. 13 depicts the image manipulation application 116 selecting the candidate cropped image 1108*a* as having the smallest distance metric. The distance metric between the candidate cropped image 1108*a* and the example image 1106*d* being smallest can correspond each of the images including a seated person positioned in the frame slightly to the right of center.

Although FIGS. 12-13 depict the image manipulation application 116 selecting a single example image, other implementations are possible. For example, FIGS. 14-15 are modeling diagrams depicting a flow of communication for automatically cropping an input image 1202 based on distance metric with respect to multiple example images.

The image manipulation application 116 can compare the input image 1202 of a person standing in front of a house to example images 1206*a*-*d* stored in a database 1204. For simplicity, FIGS. 14-15 depict the input image 1202 and example image 1206*a*-*d* using line drawings. The image manipulation application 116 can execute a visual similarity search algorithm to rank the example images 1206*a*-*d* based on the respective visual similarity between each image and the input image 1202. The image manipulation application 116 can select a predetermined number of the example images having the greatest visual similarity to the test image. FIG. 14 depicts the image manipulation application 116 selecting the two example images 1206*a*, 1206*b* (depicting groups of people) as more similar to the input image 1202 than the example image 1206*c* (depicting a bird) or the example image 1206*d* (depicting only a house). The image manipulation application 116 can generate, select, or otherwise access a corresponding number of candidate cropped images, such as the candidate cropped images 1208*a*, 1208*b*. The image manipulation application 116 can determine a distance metric between each of the candidate cropped images 1208*a*, 1208*b* and each of the example images 1206*a*, 1206*b* selected as being the most similar to the input image. The image manipulation application 116 can select one or more of the candidate cropped versions having the smallest distance metric. For example, FIG. 15 depicts the image manipulation application 116 selecting the candidate cropped image 1208*b* having the smallest distance metric. The distance metric between the candidate cropped image 1208*b* and the example images 1206*a*, 1206*b* being smallest can correspond to the candidate cropped image 1208*b* depicting the person in the center of the frame and each of the example images 1206*a*, 1206*b* depicting the groups of people in the center of the frames.

Figure 14:
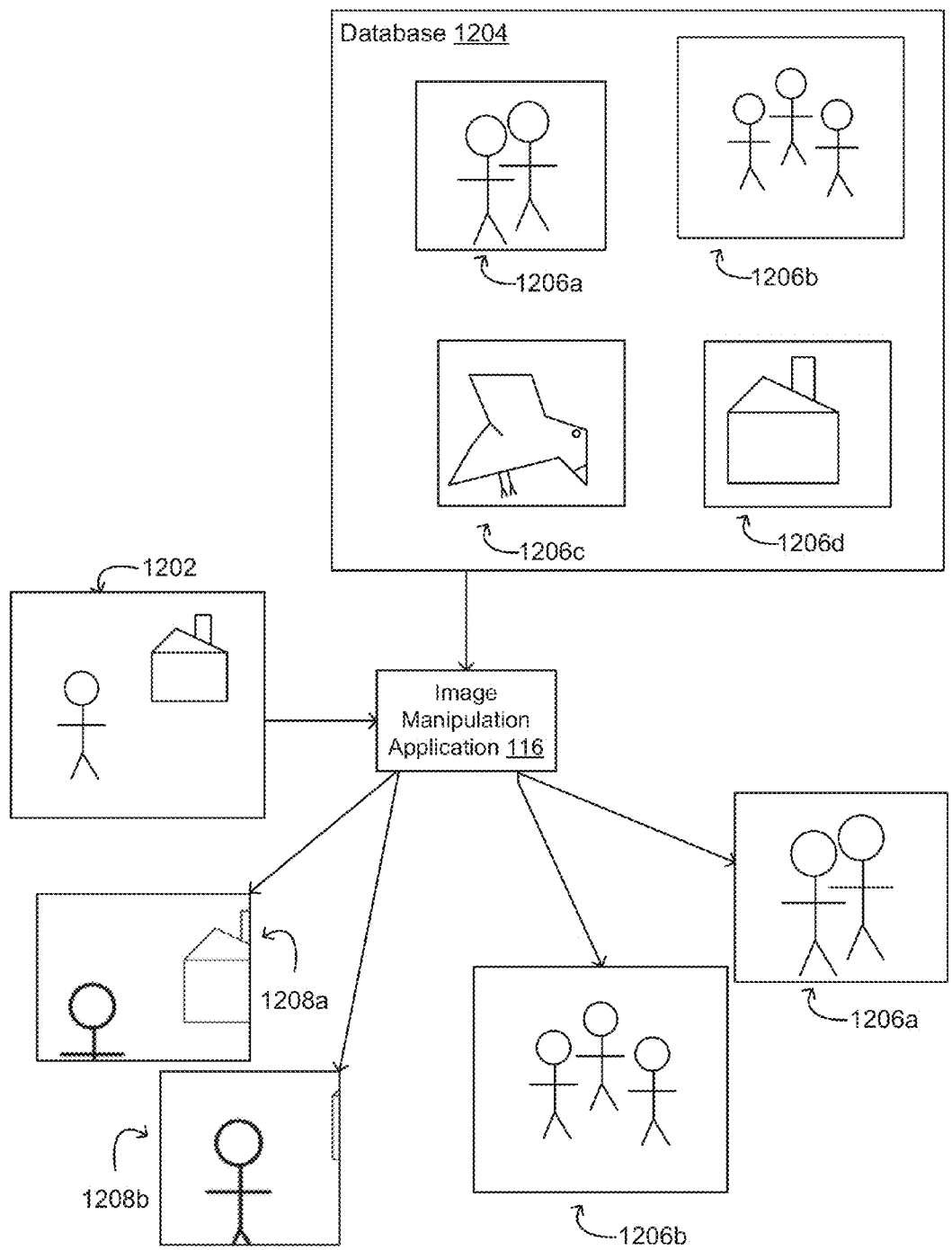
FIG. 14 is a modeling diagram depicting a flow of communication for automatically cropping an input image based on distance metric with respect to multiple example images.
Figure 15:
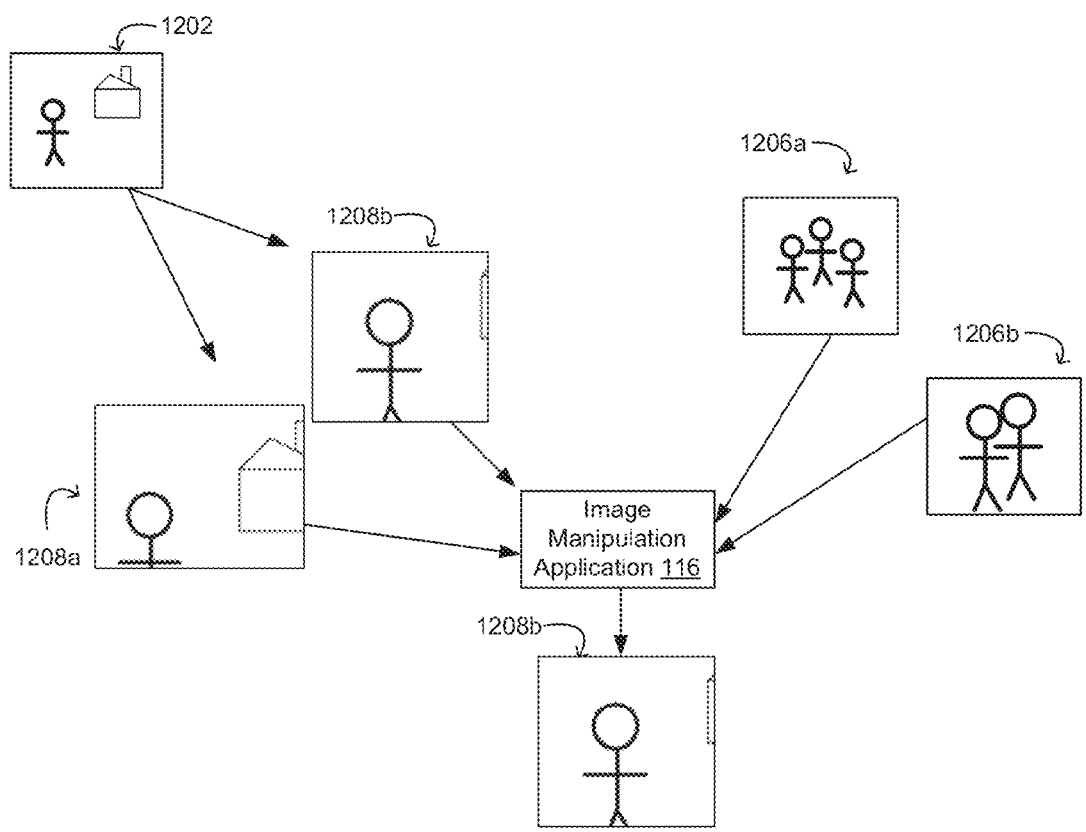
FIG. 15 is a modeling diagram depicting a flow of communication for automatically cropping an input image based on distance metric with respect to multiple example images.

Although FIGS. 12 and 14 depict examples images stored in a database, other implementations are possible. The processor 104 may access example images from any suitable data structure.

Although FIGS. 12 and 14 depict a database having only four example images, a database may include any number of example images.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method executed by a processor, the method comprising:
   receiving a first image and a second image;
   generating a first set of points corresponding to a first edge of at least a first object in the first image and a second set of points corresponding to a second edge of at least a second object in the second image;
   determining costs of arcs connecting the first set of points to the second set of points by, for each of the first set of points, determining a respective cost of a respective arc connecting the point from the first set of points to at least some of the second set of points, wherein the respective cost is determined based on a respective point descriptor for each point of the respective arc;
   determining a minimum set of costs between the first set of points and the second set of points; and
   obtaining a distance metric for the first image and the second image, wherein the distance metric is based at least in part on the minimum set of costs.

2. The method of claim 1, wherein the minimum set of costs comprises, for each of the second set of points, a respective cost of a respective arc connecting the point from the second set of points to a respective point in the first set of points.

3. The method of claim 1, further comprising:
   for each of the first set of points, generating a respective first point descriptor, wherein the respective first point descriptor comprises a respective first vector describing a respective first edge confidence, a respective first scale-invariant feature transform descriptor, a respective first shape context describing an arrangement of at least one additional point in the first set around the point, and a respective position of the point in a plane;
   for each of the second set of points, generating a respective second point descriptor, wherein the respective second point descriptor comprises a respective second vector describing a respective second edge confidence, a respective second scale-invariant feature transform descriptor, a respective second shape context describing the arrangement of at least one additional point in the second set around the point, and a respective position of the point in a plane;
   wherein the respective cost of each arc is determined based on a difference between point descriptors for the points connected by the arc.

4. The method of claim 1, further comprising:
   segmenting each of the first image and the second image to obtain the first edge for the first object and the second edge for the second object;
   obtaining a first edge confidence for the first edge based on an accuracy of segmenting the first image; and
   obtaining a second edge confidence for the second edge based on an accuracy of segmenting the second image;
   wherein generating the first set of points comprises sampling the first edge, each of the first set of points being associated with the first edge confidence;
   wherein generating the second set of points comprises sampling the second edge, each of the second set of points being associated with the second edge confidence.

5. The method of claim 1, further comprising:
   determining that the first set of points and the second set of points include different numbers of points; and
   adding at least one outlier point to at least one of the first set of points or the second set of points, wherein adding the at least one outlier point equalizes the number of points between first set of points and the second set of points;
   wherein a respective cost of a respective arc between a outlier point and a non-outlier point has a higher cost than an additional respective arc between the non-outlier point and an additional non-outlier point.

6. The method of claim 1,
   wherein determining the costs of arcs connecting the first set of points to the second set of points comprises:
      organizing the first set of points and the second set of points in a bipartite graph, wherein the first set of points comprises a first set of nodes in the bipartite graph and the second set of points comprises a second set of nodes in the bipartite graph;
      for each of the first set of nodes,
         generating a respective arc connecting the node to each of the second set of nodes, and
         identifying a respective cost of the respective arc;
   wherein determining the minimum set of costs comprises generating a minimum cost graph from the bipartite graph.

7. The method of claim 1, further comprising:
   accessing a plurality of cropped versions of the second image;
   for each of the plurality of cropped versions of the second image, obtaining a respective distance metric between the first image and the cropped version of the second image; and
   selecting at least one of the plurality of cropped versions of the second image having a minimum distance metric.

8. The method of claim 1,
   wherein the processor is comprised in an imaging device,
   wherein the first image is stored in a non-transitory computer-readable medium accessible by the processor,
   wherein the second image comprises transient image data imaged by the imaging device;
   further comprising:
      determining that the distance metric is less than or equal to a threshold distance metric; and
      responsive to determining that the distance metric is less than or equal to the threshold distance metric, configuring the processor to store the transient image data to the non-transitory computer-readable medium.

9. A method executed by a processor, the method comprising:
- receiving an input image and an example image;
- accessing a plurality of cropped images, the plurality of cropped images comprising cropped versions of the input image;
- determining a plurality of distance metrics by, for each of the plurality of cropped images:
  - generating a first set of points corresponding to a first edge of at least a first object in the example image and a second set of points corresponding to a second edge of at least a second object in the cropped image,
  - determining costs of arcs connecting the first set of points to the second set of points by, for each of the first set of points, determining a respective cost of a respective arc connecting the point from the first set of points to at least some of the second set of points, wherein the respective cost is determined based on a respective point descriptor for each point of the respective arc,
  - determining a minimum set of costs between the first set of points and the second set of points, wherein the minimum set of costs comprises, for each of the second set of points, a respective cost of a respective arc connecting the point from the second set of points to a respective point in the first set of points, and
  - obtaining a distance metric for example image and the cropped image, wherein the distance metric is based at least in part on the minimum set of costs;
- determining a minimum distance metric of the plurality of distance metrics; and
- selecting at least one of the plurality of cropped versions of the input image having the minimum distance metric.

10. The method of claim 9, further comprising:
- receiving at least one additional input image;
- determining an at least one additional distance metric for example image and the at least one additional input image;
- selecting the input image based on the at least one additional distance metric exceeding the distance metric for the example image and the at least one additional input image;
- identifying a cropping for the input image based on selecting the at least one of the plurality of cropped versions of the input image having the minimum distance metric; and
- applying the cropping to the at least one additional input image.

11. The method of claim 9, wherein receiving the example image comprises:
- accessing a database comprising a plurality of example images that includes the example image;
- for each of the plurality of example images, performing a visual similarity search; and
- based on performing the visual similarity search, determining that at least the example image is more similar to the input image than at least some of the plurality of example images.

12. A non-transitory computer-readable medium embodying program code executable by a processing device, the non-transitory computer-readable medium comprising:
- program code for receiving a first image and a second image;
- program code for generating a first set of points corresponding to a first edge of at least a first object in the first image and a second set of points corresponding to a second edge of at least a second object in the second image;
- program code for determining costs of arcs connecting the first set of points to the second set of points by, for each of the first set of points, determining a respective cost of a respective arc connecting the point from the first set of points to at least some of the second set of points, wherein the respective cost is determined based on a respective point descriptor for each point of the respective arc;
- program code for determining a minimum set of costs between the first set of points and the second set of points; and
- program code for obtaining a distance metric for the first image and the second image, wherein the distance metric is based at least in part on the minimum set of costs.

13. The non-transitory computer-readable medium of claim 12, further comprising:
- program code for generating, for each of the first set of points, a respective first point descriptor, wherein the respective first point descriptor comprises a respective first vector describing a respective first edge confidence, a respective first scale-invariant feature transform descriptor, a respective first shape context describing an arrangement of at least one additional point in the first set around the point, and a respective position of the point in a plane;
- program code for generating, for each of the second set of points, a respective second point descriptor, wherein the respective second point descriptor comprises a respective second vector describing a respective second edge confidence, a respective second scale-invariant feature transform descriptor, a respective second shape context describing the arrangement of at least one additional point in the second set around the point, and a respective position of the point in a plane;
- wherein the respective cost of each arc is determined based on a difference between point descriptors for the points connected by the arc.

14. The non-transitory computer-readable medium of claim 12, further comprising:
- program code for segmenting each of the first image and the second image to obtain the first edge for the first object and the second edge for the second object;
- program code for obtaining a first edge confidence for the first edge based on an accuracy of segmenting the first image; and
- program code for obtaining a second edge confidence for the second edge based on an accuracy of segmenting the second image;
- wherein generating the first set of points comprises sampling the first edge, each of the first set of points being associated with the first edge confidence;
- wherein generating the second set of points comprises sampling the second edge, each of the second set of points being associated with the second edge confidence.

15. The non-transitory computer-readable medium of claim 12, further comprising:
- program code for determining that the first set of points and the second set of points include different numbers of points; and
- program code for adding at least one outlier point to at least one of the first set of points or the second set of points, wherein adding the at least one outlier point equalizes the number of points between first set of points and the second set of points;

wherein a respective cost of a respective arc between a outlier point and a non-outlier point has a higher cost than an additional respective arc between the non-outlier point and an additional non-outlier point.

16. The non-transitory computer-readable medium of claim 12, wherein determining the costs of arcs connecting the first set of points to the second set of points comprises:

organizing the first set of points and the second set of points in a bipartite graph, wherein the first set of points comprises a first set of nodes in the bipartite graph and the second set of points comprises a second set of nodes in the bipartite graph;

for each of the first set of nodes, generating a respective arc connecting the node to each of the second set of nodes, and identifying a respective cost of the respective arc;

wherein determining the minimum set of costs comprises generating a minimum cost graph from the bipartite graph.

17. The non-transitory computer-readable medium of claim 12, further comprising:

program code for generating a plurality of cropped versions of the second image;

program code for obtaining, for each of the plurality of cropped versions of the second image, a respective distance metric between the first image and the cropped version of the second image; and program code for selecting at least one of the plurality of cropped versions of the second image having a minimum distance metric.

18. The non-transitory computer-readable medium of claim 12, further comprising:

program code for receiving an additional input image;

program code for generating an additional set of points corresponding to an additional edge of at least an additional object in the additional input image;

program code for determining additional costs of arcs connecting the first set of points to the additional set of points;

program code for determining an additional minimum set of costs between the first set of points and the additional set of points;

program code for obtaining an additional distance metric for the first image and the additional input image;

program code for determining a minimum of the distance metric and the additional distance metric; and program code for selecting one of the second image and the additional input image as a closest match for the first image based on the minimum of the distance metric and the additional distance metric.

19. A system comprising:

a processor configured to execute instructions stored in a non-transitory computer-readable medium;

wherein the instructions comprise an image manipulation application configured to perform operations comprising:

receiving a first image and a second image, generating a first set of points corresponding to a first edge of at least a first object in the first image and a second set of points corresponding to a second edge of at least a second object in the second image, determining costs of arcs connecting the first set of points to the second set of points by, for each of the first set of points, determining a respective cost of a respective arc connecting the point from the first set of points to at least some of the second set of points, wherein the respective cost is determined based on a respective point descriptor for each point of the respective arc, determining a minimum set of costs between the first set of points and the second set of points, and obtaining a distance metric for the first image and the second image, wherein the distance metric is based at least in part on the minimum set of costs.

20. The system of claim 19, wherein the image manipulation application is further configured to perform additional operations comprising:

generating, for each of the first set of points, a respective first point descriptor, wherein the respective first point descriptor comprises a respective first vector describing a respective first edge confidence, a respective first scale-invariant feature transform descriptor, a respective first shape context describing an arrangement of at least one additional point in the first set around the point, and a respective position of the point in a plane;

generating, for each of the second set of points, a respective second point descriptor, wherein the respective second point descriptor comprises a respective second vector describing a respective second edge confidence, a respective second scale-invariant feature transform descriptor, a respective second shape context describing the arrangement of at least one additional point in the second set around the point, and a respective position of the point in a plane;

wherein the respective cost of each arc is determined based on a difference between point descriptors for the points connected by the arc.

21. The system of claim 19, wherein the image manipulation application is further configured to perform additional operations comprising:

segmenting each of the first image and the second image to obtain the first edge for the first object and the second edge for the second object;

obtaining a first edge confidence for the first edge based on an accuracy of segmenting the first image; and obtaining a second edge confidence for the second edge based on an accuracy of segmenting the second image;

wherein generating the first set of points comprises sampling the first edge, each of the first set of points being associated with the first edge confidence;

wherein generating the second set of points comprises sampling the second edge, each of the second set of points being associated with the second edge confidence.

22. The system of claim 19, further comprising an imaging device;

wherein the second image comprises transient image data imaged by the imaging device;

wherein the image manipulation application is further configured to perform additional operations comprising:

determining that the distance metric is less than or equal to a threshold distance metric, and responsive to determining that the distance metric is less than or equal to the threshold distance metric, configuring the processor to store the transient image data provided by the imaging device to the non-transitory computer-readable medium.

* * * * *